United States Patent
McNutt (10) Patent No.: US 7,171,578 B2
(45) Date of Patent: Jan. 30, 2007

(54) PULSE OUTPUT FUNCTION FOR PROGRAMMABLE LOGIC CONTROLLER WITH LINEAR FREQUENCY CHANGE

(75) Inventor: Alan D. McNutt, Johnson City, TN (US)

(73) Assignee: Siemens Energy & Automation, Inc., Alpharetta, GA (US)

(*) Notice: Subject to any disclaimer, the term of this patent is extended or adjusted under 35 U.S.C. 154(b) by 446 days.

(21) Appl. No.: 10/770,663

(22) Filed: Feb. 3, 2004

(65) Prior Publication Data

US 2004/0174200 A1 Sep. 9, 2004

Related U.S. Application Data

(60) Provisional application No. 60/450,210, filed on Feb. 26, 2003.

(51) Int. Cl.
*G06F 1/04* (2006.01)
(52) U.S. Cl. ............... 713/501; 318/567; 327/291; 388/832; 331/179
(58) Field of Classification Search ........... 713/501; 318/567; 327/291; 331/179; 388/832
See application file for complete search history.

(56) References Cited

U.S. PATENT DOCUMENTS

| 4,103,216 A | * | 7/1978 | Hayes | ............... 318/685 |
| 5,572,105 A | * | 11/1996 | Nojima et al. | ............... 318/696 |
| 5,977,739 A | | 11/1999 | Ohsawa | ............... 318/685 |
| 6,717,383 B1 | * | 4/2004 | Brunt et al. | ............... 318/723 |
| 2004/0059495 A1 | | 3/2004 | Nakashima et al. | ............... 701/96 |

FOREIGN PATENT DOCUMENTS

| DE | 4417424 A1 | 11/1995 |
| DE | 19501652 A1 | 7/1996 |
| WO | WO 02/065224 A1 | 1/2002 |

OTHER PUBLICATIONS

PCT International Search Report, mailed Jan. 13, 2005 (5 pages).
PCT Written Opinion of the International Searching Authority (8 pages).

* cited by examiner

Primary Examiner—Thuan Du (57) ABSTRACT

Certain exemplary embodiments provide a method for producing pulsed outputs, comprising: automatically changing a first user-specified pulse frequency to a second pulse frequency; and automatically outputting a plurality of pulses from the programmable logic controller at frequencies varying between the first user-specified pulse frequency and the second pulse frequency according to a user-specified linear-time-rate variation.

42 Claims, 5 Drawing Sheets

PULSE OUTPUT FUNCTION FOR PROGRAMMABLE LOGIC CONTROLLER WITH LINEAR FREQUENCY CHANGE

CROSS-REFERENCE TO RELATED APPLICATIONS

This application claims priority to now abandoned provisional application Ser. No. 60/450,210, filed 26 Feb. 2003.

BACKGROUND

Programmable logic controllers can be supplied with some means of producing pulsed outputs on their discrete output points that can be used for controlling the motion of stepper motors, pulse input controlled servo-motor controllers, and/or for other equipment that is controlled by an input pulse frequency, pulse width, and/or number of pulses.

A desired motion profile can be described in terms of desired pulse frequency versus time. Such profiles can be used in industry to describe, for example, the speed of a motor positioning a tool, where the frequency of pulses delivered to the motor system controls the rotational speed. Typical motor systems used in industry today have scaling factors of from 200 to 200000 pulses per revolution. Typical acceleration times from minimum to maximum frequency can range from a few milliseconds up to many seconds. The actual object of the motion is often to move a specific distance, expressed as a specific number of pulses, while satisfying constraints on acceleration, and change in acceleration. The constraints on acceleration and change in acceleration can have any of numerous motivations, including controlling motor torque load, limiting wear on drive trains, avoiding damage to tools, work pieces, and/or handled materials, and/or limiting acoustic noise, etc. Controlled changes in acceleration might or might not be included in a particular application, but are increasingly valued as users strive for higher speed movement without introducing disruptive jerks.

SUMMARY

Certain exemplary embodiments provide a method for producing pulsed outputs, comprising: automatically changing a first user-specified pulse frequency to a second pulse frequency; and automatically outputting a plurality of pulses from the programmable logic controller at frequencies varying between the first user-specified pulse frequency and the second pulse frequency according to a user-specified linear-time-rate variation.

BRIEF DESCRIPTION OF THE DRAWINGS

A wide array of potential embodiments can be better understood through the following detailed description and the accompanying drawings in which.

DEFINITIONS

When the following terms are used herein, the accompanying definitions apply:

programmable logic controller (PLC)—a device that follows programmed instructions to provide automated monitoring and/or control functions over a machine and/or process by evaluating a set of inputs. A PLC can be used to automate complex functions, for example, in machining, packaging, materials handling, and/or other applications. A PLC can be utilized to control an industrial process.

pulse—a transient wave comprising a voltage of a predetermined amplitude that extends for a predetermined time period.

pulse train—a series of pulses that can control the operation of a motion device, e.g., a motion controller, such as a stepper motor controller, a servo controller, an actuator controller, etc.; a motion drive, such as a stepper drive, servo drive, etc.; and/or a actuator, such as a stepper motor, servomotor, linear motor, motor, ball screw, servo valve, hydraulic actuator, pneumatic valve, etc. The motion device can interpret the number, frequency, and/or length of pulses as commands for certain movements.

pulse generator—a device that generates pulses.

pulsed outputs—a series of pulses provided from a device.

frequency—the number of times a specified periodic phenomenon occurs within a specified interval. For example, a pulse frequency could vary from 1 pulse per second to 10,000 pulses per second. The frequency of a pulse train applied to a motion controlled system will typically be proportional to the velocity of the motion device, and thus the terms frequency (of the pulse train) and velocity (of the motion device) are used interchangeably herein.

acceleration—a change in frequency with respect to time.

jerk—a change in acceleration with respect to time.

linear-time-rate variation—a change of a pulse variable (e.g., frequency, acceleration, jerk, etc.) with respect to time, characterized by a constant increment of change per unit time.

pulse frequency output profile—a representation (e.g., graphical, tabular, etc.) of a desired variation of pulse frequency with respect to time or pulse count, or an equivalent representation, such as a representation of the velocity and position of a motion device whereby velocity is related to a pulse frequency and position is related to a pulse count. For example, a pulse frequency output profile could specify that for the first 500 pulses of operation, the pulse frequency should increase from 10 pulses per second to 100 pulses per second, and afterwards remain constant for the next 300 pulses, then decrease at a specified rate, with pulse output to stop after reaching 20 pulses per second. A pulse frequency output profile as a whole can be considered a specification and/or can be considered a collection of specifications, each specification relating to one or more constituents of the profile, such as a line segment.

specification—a description or characterization.

line segment—a portion of a pulse frequency output profile that is characterized, or specified, by certain parameters such as an initial frequency, an initial acceleration, and a change in acceleration with respect to time, and a specification of how the line segment ends. The specification of how a line segment ends can be completion of a specific pulse count, or the reaching of a specific frequency goal, or some external event.

polarity of change—whether a rate of change is positive or negative.

automatically—acting or operating in a manner essentially independent of external influence or control. For example, an automatic light switch can turn on upon "seeing" a person in its view, without the person manually operating the light switch.

DETAILED DESCRIPTION

Certain exemplary embodiments provide a pulse output function for a programmable logic controller. The pulse output function can provide a means for producing a user specified frequency of pulses, for varying the pulse frequency according to a user specified linear rate of change with time (constant acceleration), and/or for varying the frequency in response to a user specified linear variation in acceleration with respect to time. The function can provide for user specified pulse frequency output profiles consisting of an indefinitely large and indefinitely intermixed sequence of line segments, each line segment representing an increasing frequency, decreasing frequency, and/or constant frequency output. The frequency magnitude, rate, and polarity of change in frequency, and rate and polarity of change in acceleration can be independently specified for each line segment. The length of each line segment can be independently specified as number of pulses, as an indefinite length to be terminated by an external event, and/or as an indefinite length to be terminated by reaching a specific frequency goal. The operation of a specified line segment can be interrupted (as, for example, by an emergency stop function). On such line segment interruption, the pulse output can be abruptly terminated, and/or a transition can be ordered to a newly specified line segment (as, for example, an item in an emergency shut-down sequence) without discontinuities in the pulse generation.

Programmable logic controllers can be supplied with some means of producing pulsed outputs on their discrete output points that can be used for controlling stepper motors, pulse input controlled servo-motor controllers, and/or for other equipment that is controlled by an input pulse frequency, pulse width, and/or number of pulses. Programmable logic controllers can focus on user specification of pulse width as a simple implementation. Programmable logic controllers can include a means for delivering a sequence of user specifications so as to produce a desired profile of pulse width outputs. Programmable logic controllers can include a means of interpolating changes in pulse width between specification points so as to reduce generally undesired discontinuities in pulse width while following a specified ramped change in pulse width.

It is recognized that pulse width is inversely related to frequency. Mechanisms that depend on pulse width and change in pulse width specification can be inconvenient to use when the user desired specification is in frequency and change in frequency. In particular, in attempting to describe frequency changes with respect to time (acceleration), and changes in acceleration with respect to time, the use of pulse width and change in pulse width specifications can require an inconveniently large number of points to describe a line segment with sufficient accuracy.

The arithmetic operations required for computing frequency targets according to typical desired rules and converting these frequency targets to pulse widths are reasonably simple. Typical programmable logic controllers for low cost applications have limited available processing power. Certain applications can require pulse output frequencies of hundreds of KHz to MHz. Certain applications do not allow sufficient time for acceleration change, frequency change, and frequency-to-pulse width conversion calculations to be performed as needed on a pulse by pulse basis by a typical programmable logic controller.

Certain exemplary embodiments can provide dedicated logic to perform these calculations, coupled with input data pipelining mechanisms to allow a consistent supply of timely new data, and state machine logic to manage the calculations, deliver correct calculation results to the pulse generator, and manage transitions between desired operating modes. The dedicated logic can use fixed point calculations rather than the generally more complicated and more expensive floating point calculation mechanisms. In particular, the computation of target frequency and target acceleration at a particular time can be carried out as a cumulative addition of incremental changes. By allowing the rate of such cumulative additions to be independently specified, the fixed point additions can be scaled to cover a range of frequency/time/rate of change values that might otherwise require excessive word length or floating point calculation hardware.

Figure 1:
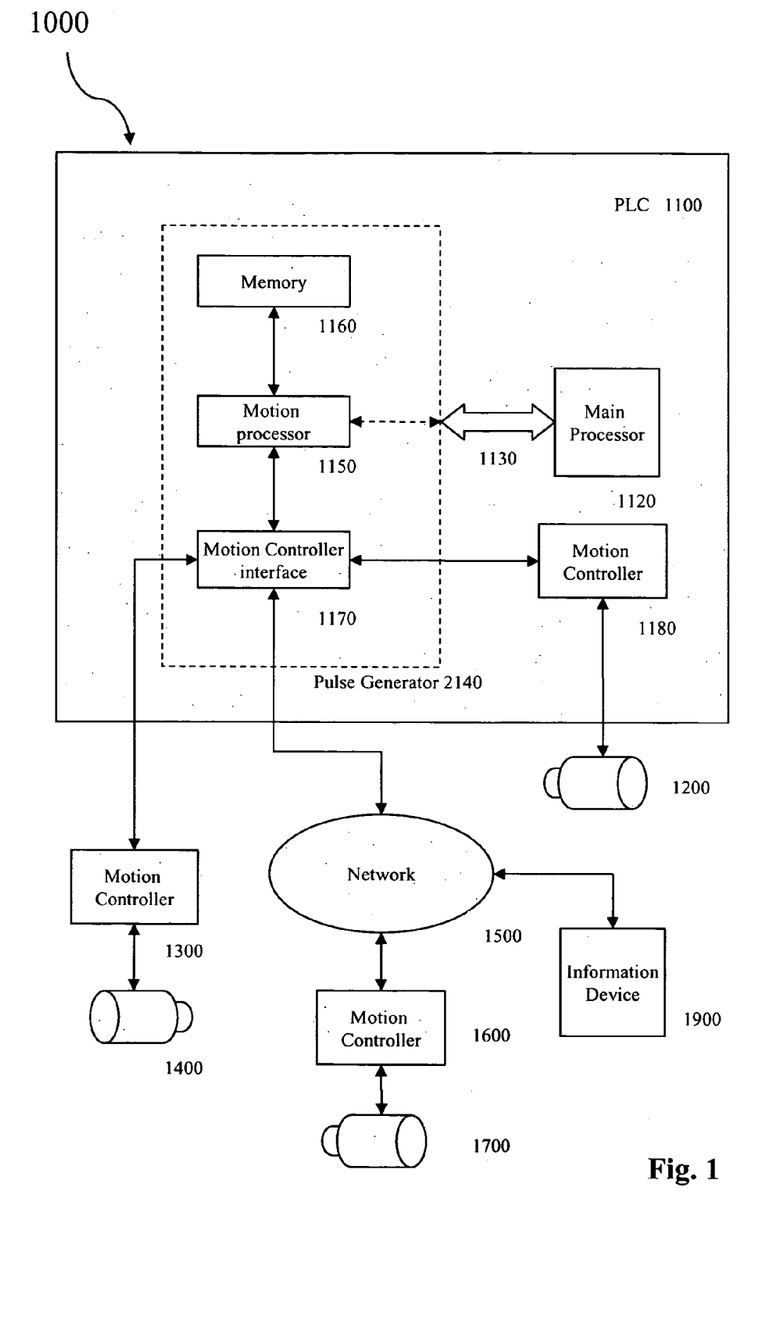
FIG. 1 is a block diagram of an exemplary embodiment of a system 1000.

FIG. 1 is a block diagram of exemplary embodiment of a system 1000. System 1000 can include an information device such as a programmable logic controller ("PLC") 1100 comprising a main processor 1120 coupled via a connector 1130 to a pulse generator 1140. In certain embodiments, pulse generator 1140 can connect to a connector 1300 such as a system backplane and/or an expansion input/output bus of PLC 1100.

Pulse generator 1140 can be integral to PLC 1100. That is, once installed, pulse generator 1140 can be a component of PLC 1100, rather than free standing. Pulse generator 1140 can include a motion processor 1150 having a memory 1160, such as a dual port RAM. Motion processor 1150 can be a commercially available general-purpose microprocessor. In another embodiment, motion processor 1150 can be an Application Specific Integrated Circuit (ASIC) that has been designed to implement in its hardware and/or firmware at least a part of a method in accordance with an embodiment of the present invention. In yet another embodiment, motion processor 1150 can be a Field Programmable Gate Array (FPGA).

Memory 1160 can contain instructions that can be embodied in software, which can take any of numerous forms that are well known in the art. Pulse generator 1140 also can include a communications interface 1170, such as a bus, a connector, a telephone line interface, a wireless network interface, a cellular network interface, a local area network interface, a broadband cable interface, etc.

Pulse generator 1140 can affect a motion device. A motion device can be any device capable of being controlled by a variable frequency pulse train, including actuator controller, etc.; a motion drive, such as a stepper drive, servo drive, etc.; and/or a actuator, such as a stepper motor, servomotor, linear motor, motor, ball screw, servo valve, hydraulic actuator, pneumatic valve, etc. Pulse generator 1140 can produce a series of pulses, called a pulse train. According to certain exemplary embodiments, a variable frequency pulse generator can produce a pulse train that can vary in frequency, count, width, and/or differential width (also referred to herein as "change in pulse width"). At the motion device, the frequency of the pulse train can control speed and/or the pulse count can control position.

Pulse generator 1140 can be connected to a motion controller 1300 that is separate from PLC 1100. Motion controller 1300 can be connected to a motion drive and/or an actuator 1400. Pulse generator 1140 also can be connected via a network 1500 to a motion controller 1600 that is separate from PLC 1100. Network 1500 can be a public switched telephone network (PSTN), a wireless network, a cellular network, a local area network, the Internet, etc. Motion controller 1600 can be connected to a motion drive and/or an actuator 1700. Further, pulse generator 1140 can be connected to a motion controller 1180 that is integral to PLC 1100. Motion controller 1180 can be connected to a motion drive and/or an actuator 1200.

Connected to network 1500 also can be an information device 1900, such as a traditional telephone, telephonic device, cellular telephone, mobile terminal, Bluetooth device, communicator, pager, facsimile, computer terminal, personal computer, etc. Information device 1900 can be used to program, interact with, and/or monitor pulse generator 1140.

Figure 2:
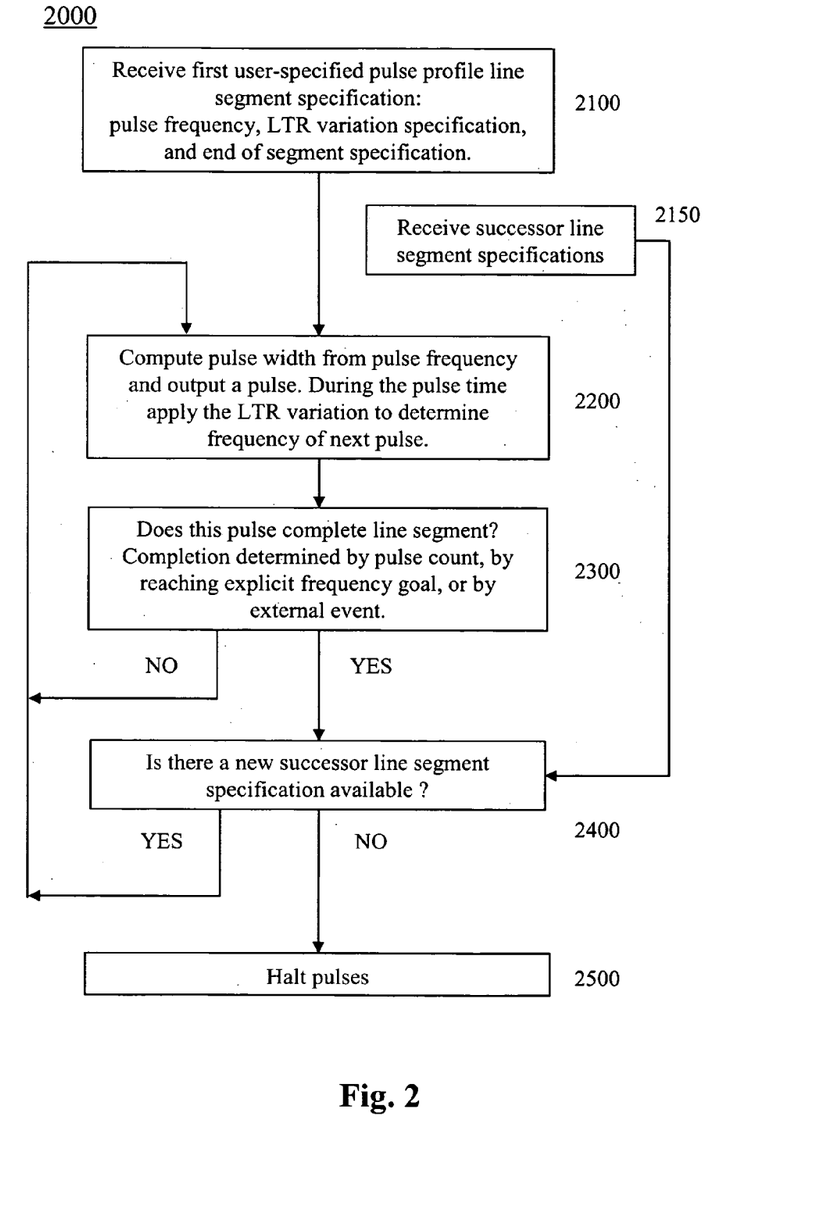
FIG. 2 is a flow chart of an exemplary embodiment of a method 2000.

FIG. 2 is a flow chart of an exemplary embodiment of a method 2000. At activity 2100, a first user-specified line segment specification can be received and/or derived, such as from a graphical pulse frequency output profile. The profile can comprise a plurality of line segments, each of the line segments representing a frequency output selected from an increasing frequency output, a decreasing frequency output, and/or a constant frequency output. At least the first line segment can include a first or initial pulse frequency specification. Each line segment can comprise a plurality of user-specifiable variation characteristics, such as a magnitude of change, a rate of change, a polarity of change, a duration, and/or a length. One or more of the line segments can have a length specified as a number of pulses. One or more of the line segments can have an indefinite length terminable by a predetermined external event or reaching a predetermined frequency goal.

At activity 2150, an additional successor line segment specification can be received or derived. The additional line segment specification can include a new first frequency, a new linear-time-rate variation, and/or a new line segment termination specification.

At activity 2200, a pulse width can be computed from the pulse frequency. The user-specified linear-time-rate ("LTR") variation associated with the current line segment can be applied to determine the frequency of the next pulse. The LTR variation can be a change in a pulse frequency with respect to time, a change in a controlled system velocity with respect to time, a change in a pulse acceleration with respect to time, and/or a change in a controlled system acceleration with respect to time.

At activity 2300, a comparison can be made to determine if a target pulse frequency corresponding to a second user-specified pulse frequency has been reached. The second user-specified pulse frequency can be an explicitly specified frequency goal, a result of accumulating changes in frequency until a specified pulse count is reached, and/or a result of accumulating changes in frequency until an occurrence of an external event. If the target frequency has not been reached, control can return to activity 2200, and pulses can continue to be output at frequencies varying between the user-specified first pulse frequency and the second pulse frequency. If the target frequency (or end of line segment) has been reached, control can be transferred to activity 2400.

At activity 2400, the user-specified linear-time-rate variation can be automatically changed, such as from one line segment to a successor line segment of a pulse frequency output profile. The profile can be comprised of a plurality of line segments each having a length specified as terminating on reaching a number of pulses, an indefinite length that is terminated by an external event, and/or a length that is terminated by reaching a specified frequency goal. If a new successor line segment specification is available from activity 2201, this new specification can be made active and the process can resume at activity 2200. If a successor line segment has not been received at activity 2201, control can transfer to activity 2500.

At activity 2500, the output of pulses can be halted.

Figure 3:
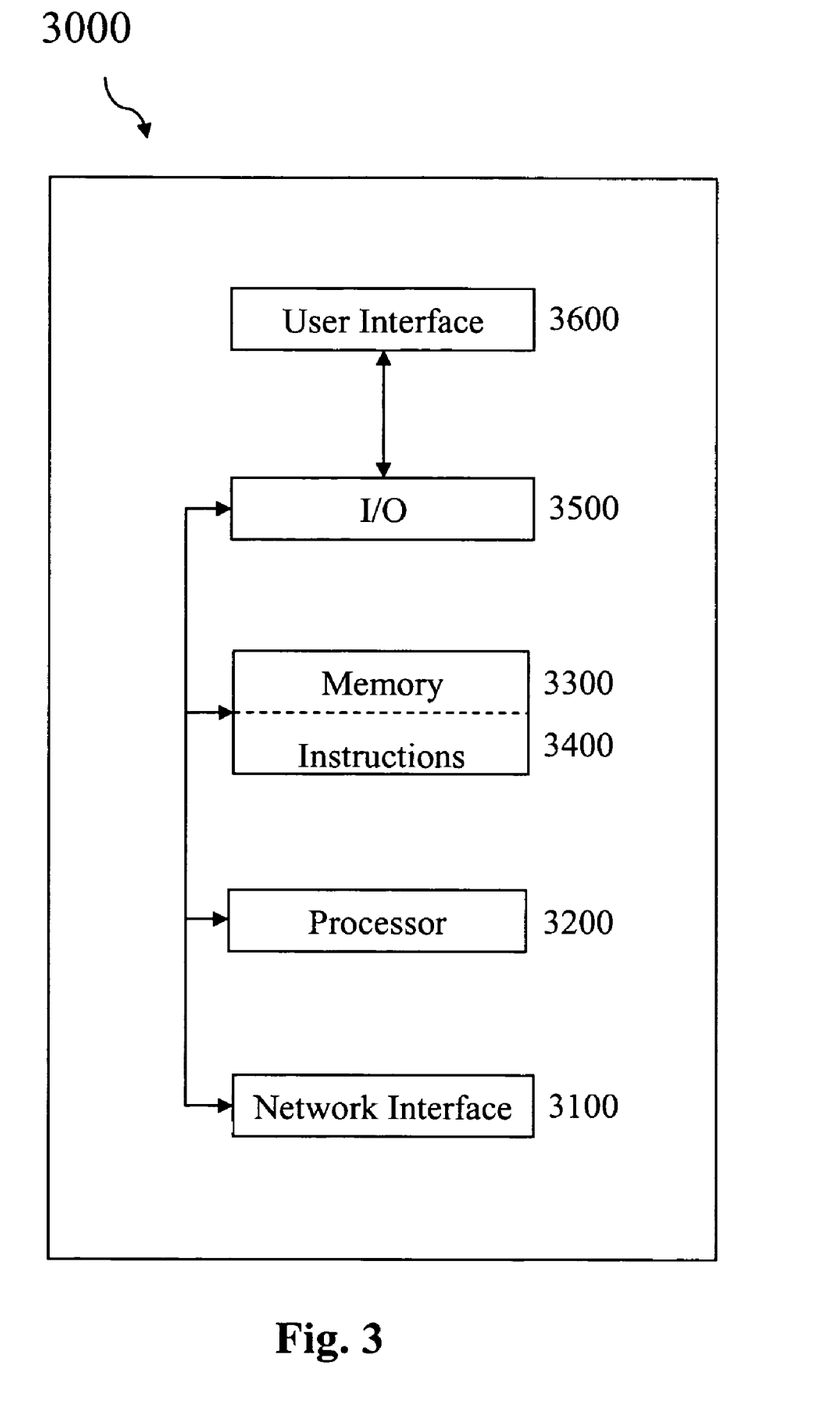
FIG. 3 is a block diagram of an exemplary embodiment of an information device 3000.

FIG. 3 is a block diagram of an exemplary embodiment of an information device 3000, which can represent any of information devices 1100, 1300, 1600, and/or 1900, etc. of FIG. 1. Information device 3000 can comprise any of numerous well-known components, such as for example, one or more network interfaces 3100, one or more processors 3200, one or more memories 3300 containing instructions 3400, one or more input/output (I/O) devices 3500, and/or one or more user interfaces 3600 coupled to I/O device 3500, etc.

As used herein, the term "information device" means any device capable of processing information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Handspring Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can include well-known components such as one or more network interfaces, one or more processors, one or more memories containing instructions, and/or one or more input/output (I/O) devices, one or more user interfaces, etc.

As used herein, the term "network interface" means any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

As used herein, the term "processor" means a device for processing machine-readable instruction. A processor can be a central processing unit, a local processor, a remote processor, parallel processors, and/or distributed processors, etc. The processor can be a general-purpose microprocessor, such the Pentium III series of microprocessors manufactured by the Intel Corporation of Santa Clara, Calif. In another embodiment, the processor can be an Application Specific Integrated Circuit (ASIC) or a Field Programmable Gate Array (FPGA) that has been designed to implement in its hardware and/or firmware at least a part of an embodiment disclosed herein.

As used herein, a "memory device" means any hardware element capable of data storage, such as for example, a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc.

As used herein, the term "firmware" means machine-readable instructions that are stored in a read-only memory (ROM). ROM's can comprise PROMs and EPROMs.

As used herein, the term "I/O device" means any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

As used herein, the term "haptic" means both the human sense of kinesthetic movement and the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

As used herein, the term "user interface" means any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc.

A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

In certain exemplary embodiments, via one or more user interfaces 3600, such as a graphical user interface, a user can provide a desired motion profile.

Figure 4:
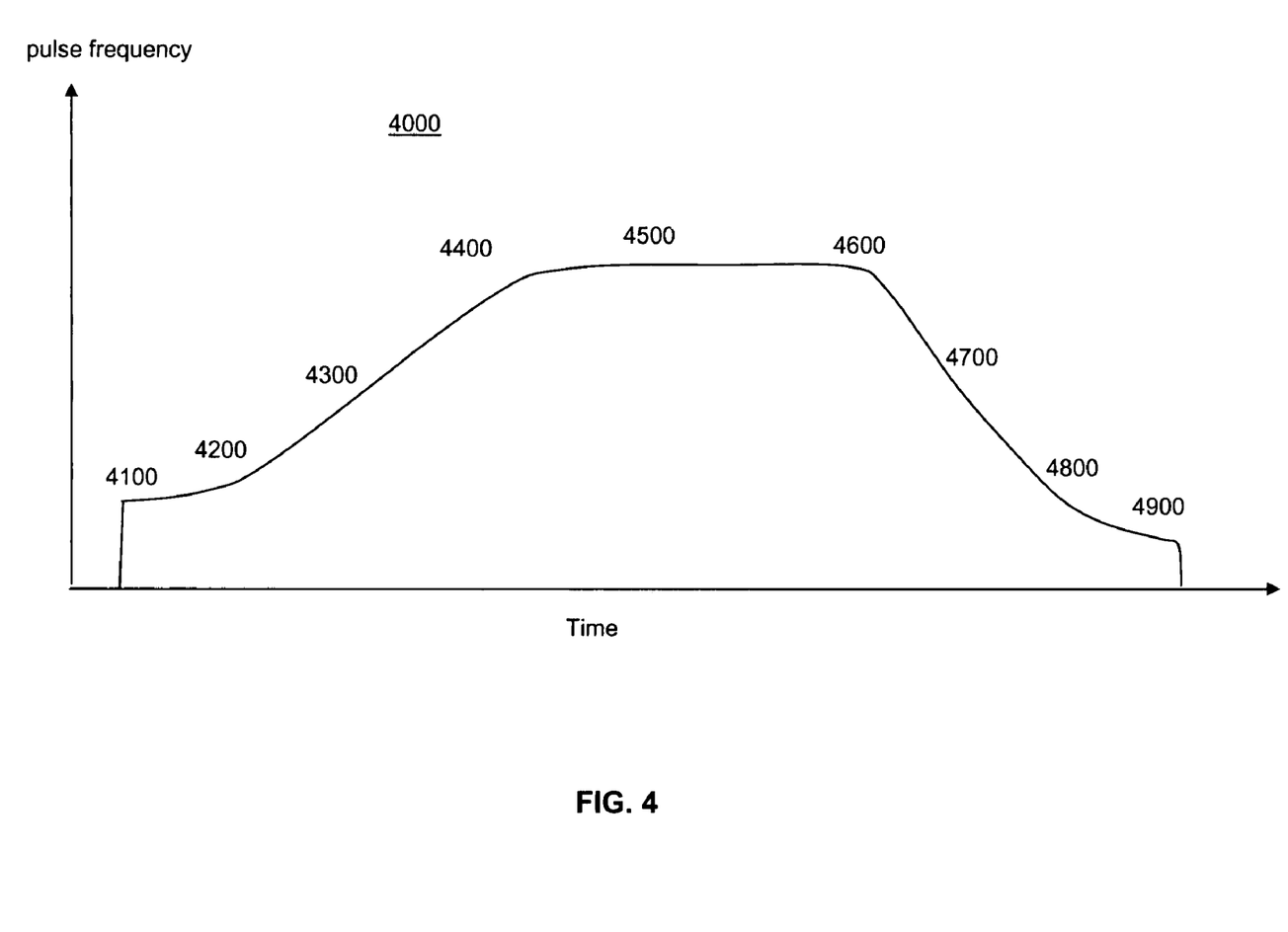
FIG. 4 is a diagram of an exemplary typical desired motion profile 4000.

FIG. 4 is a diagram of an exemplary typical desired motion profile 4000, described in terms of desired pulse frequency versus time. Such profiles can be used in industry to describe, for example, the speed of a motor positioning a tool, where the frequency of pulses delivered to the motor system controls the rotational speed. Typical motor systems used in industry today have scaling factors of from 200 to 200000 pulses per revolution. Typical acceleration times from minimum to maximum frequency can range from a few milliseconds up to many seconds. The actual object of the motion is often to move a specific distance, expressed as a specific number of pulses, while satisfying constraints on acceleration, and change in acceleration. The constraints on acceleration and change in acceleration can have any of numerous motivations, including controlling motor torque load, limiting wear on drive trains, avoiding damage to tools, work pieces, and/or handled materials, and/or limiting acoustic noise, etc. Controlled changes in acceleration, represented by the curved portions of the illustrative profile, might or might not be included in a particular application, but are increasingly valued as users strive for higher speed movement without introducing disruptive jerks.

The motion represented by the profile in FIG. 4 can start and stop with abrupt changes between 0 and some minimum finite frequency. This can be minimally required by the nature of the system, since frequency can be expressed as a series of finite width pulses. Further, typical motors have minimum start and stop speeds of, for example, 5% or 10% of maximum rated speed, below which minimums the motor might stall or operate erratically. After the initial step to the minimum start frequency, acceleration can be smoothly increased to some maximum amount, then can be smoothly decreased to zero to achieve a constant speed at the top of the profile, followed by a similar reverse process to smoothly slow down to minimum speed and stop. As used herein, a factor df means a change in frequency per unit time, and a factor ddf describes a change in df per unit time. That is, df represents an acceleration and ddf a rate of change in acceleration.

Within motion profile 4000 can be a number of regimes 4100-4900, which can be comprised of one or more line segments, and which can be described as follows:

4100: motion starts with some minimum non-zero start frequency;
  4200: df>0 and ddf>0, frequency ($f_{n+1}=f_n+df$) and acceleration ($df_{n+1}=df_n+ddf$) are increasing, updated at regular intervals $t_n$ as specified in the time interval portion of the df specification;
  4300: df>0, ddf=0, frequency is increasing at constant acceleration;
  4400: df>0, ddf<0, frequency is increasing, but acceleration is being reduced;
  4500: df=0, ddf=0, frequency is constant;
  4600: df<0, ddf<0, frequency is decreasing, acceleration is negative and growing in magnitude;

4700: df<0, ddf=0, frequency is decreasing, acceleration is constant;

4800: df<0, ddf>0, frequency is decreasing, acceleration is negative and decreasing in magnitude; and

4900: motion reaches some final minimum frequency, then stops.

Parameters of each line segment can be independently specified or maintained from a previous segment. This example is deliberately asymmetrical to illustrate flexibility of line segment description. The number of line segments can be indefinitely extensible, and can loaded from some external storage. The term "line segment" means a portion of the curve, whether or not straight, controlled by a single load from the pipeline registers.

Although FIG. 4 represents a simple motion profile of start, speed up to some constant frequency, slow down, and stop, much more complicated profiles may be required in practice and can be accommodated. Such profiles might include multiple intervals of constant speed, connected by intervening accelerations of different magnitudes, and perhaps including segments that are indefinitely extended, requiring some external signal or external data input to the system to determine the timing and nature of a next step. Parameters for each segment of the profile can be independently specified, or maintained from the previous segment, allowing for considerable flexibility in application.

Figure 5:
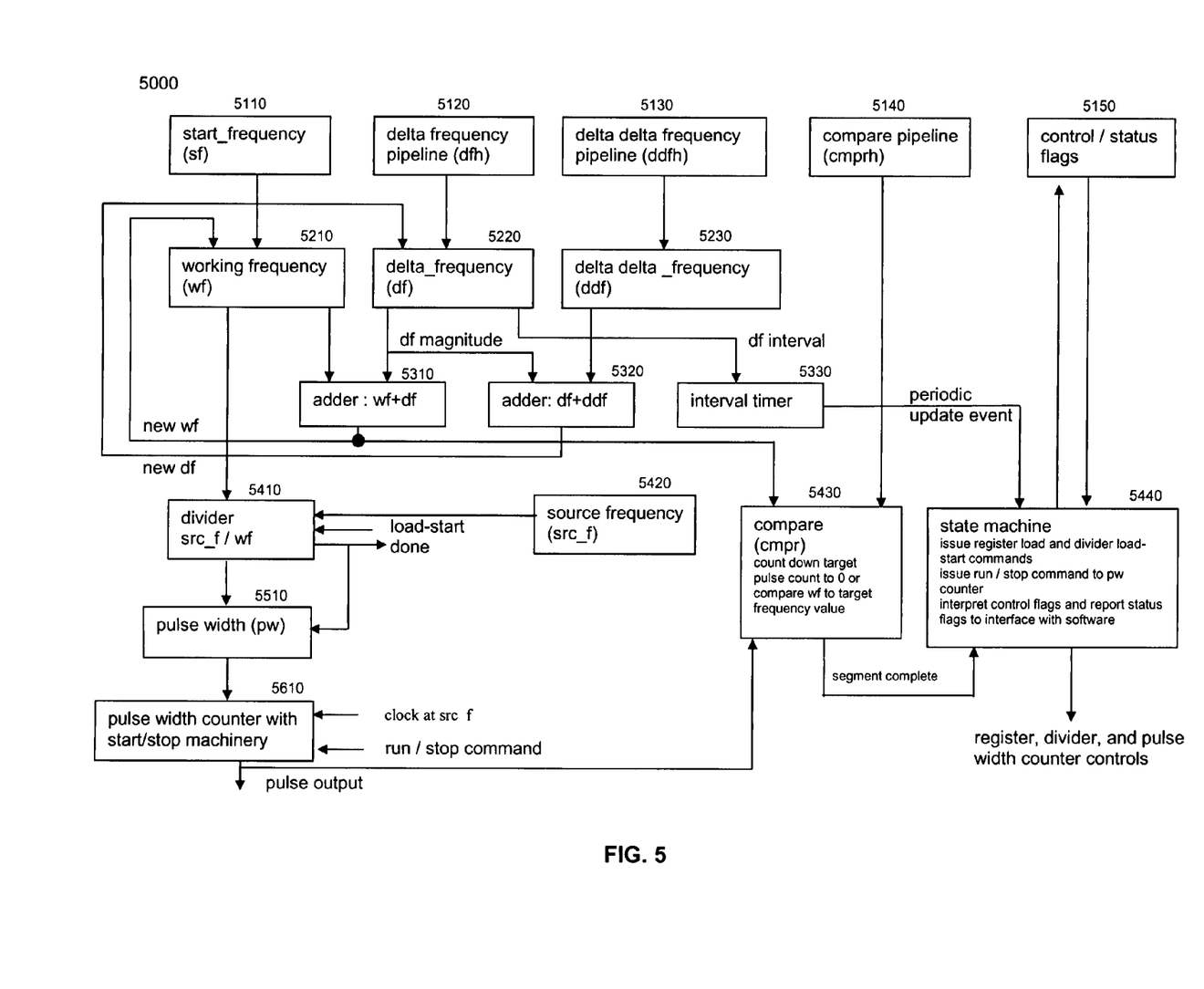
FIG. 5 is a block diagram of an exemplary embodiment of a system 5000.

FIG. 5 is a block diagram of an exemplary embodiment of a system 5000, which can include a number of components. For example, start_frequency (sf) variable 5110 can be utilized to determine a working frequency (wf) variable 5210. A delta frequency pipeline (dfh) variable 5120 can be used to determine a delta_frequency (df) variable 5220. A delta delta frequency pipeline (ddfh) variable 5130 can be used to determine a delta delta_frequency (ddf) variable 5230. A compare pipeline (cmprh) variable 5140 can be used to determine a compare (cmpr) variable 5430. Control and/or status flags 5150 can control the operation of a state machine 5440. Adder 5310 can provide a new value to working frequency (wf) variable 5210 and/or input to compare variable 5430. Adder 5320 can provide a new value to delta frequency (df) variable 5220. Interval timer 5330 can provide input to state machine 5440 to control the rate at which adder 5310 and adder 5320 operations are applied. Divider 5410 can receive input from working frequency variable 5210 and/or source frequency 5420 and can output a pulse width variable 5510 which can flow to a pulse width counter 5610.

In various exemplary embodiments, any of the following features can be provided:

1. a pulse generator that produces linear changes in frequency with respect to time (an acceleration) by adding or subtracting a specified frequency increment to the specified frequency at regular specified intervals, followed by a divider mechanism that converts the frequency specification to a pulse width specification, followed by a pulse width generator that produces the desired pulse output by counting clocks of a fixed reference frequency according to the pulse width specification;

2. a pulse generator that produces linear changes in acceleration with respect to time by adding or subtracting a specified acceleration increment to the specified frequency increment at regular specified intervals, followed by the mechanism for computing a new specified frequency, and subsequent divider and pulse width generator mechanism as in item (1);

3. a pulse generator as in item (1) or (2) equipped with pipeline data registers with controlling state machine so that a series of specifications for frequency, change in frequency, and change in acceleration, may be loaded and executed without discontinuities in pulse output, the duration of each specification (line segment) being controlled by a counted number of pulses;

4. a pulse generator as in item (1) or (2) equipped with pipeline data registers with controlling state machine so that a series of specifications for frequency, change in frequency, and change in acceleration, may be loaded and executed without discontinuities in pulse output, the duration of each specification (line segment) being terminated by reaching a specified frequency goal;

5. a pulse generator as in item (1) or (2) equipped with pipeline data registers with controlling state machine so that a series of specifications for frequency, change in frequency, and change in acceleration, may be loaded and executed without discontinuities in pulse output, the duration of each specification (line segment) being terminated by command from arbitrary outside event;

6. a pulse generator as in item (1) through (5) equipped with means for interrupting a planned series of specifications to substitute a new specification (as, for example, an emergency shut down sequence) without discontinuities in pulse output;

7. a pulse generator as in item (1) or (2) including an update interval counter and encoded interval specification, the duration of the specified interval controlling the repetition of incremental additions to frequency and acceleration, and thereby, in concert with the increment size, controlling the rate of change of frequency and acceleration. The use of a programmable interval with a wide range of interval selections extends the range of slopes (changes in frequency or acceleration) that may be controlled with a given precision of frequency, acceleration, and incremental change specifications in a fixed point format;

8. a pulse generator combining 2 or more of the features of items (3), (4), (5), (6), with data register pipeline and state machine logic capable of intermixing the specification features in an arbitrary order;

9. a pulse generator combining 1 or more of the features of items (3), (4), (5), (6) equipped with a means of identifying the last step of a sequence and stopping pulse train output precisely at the completion of the final specification;

10. a pulse generator including a means for detecting incipient math errors and interrupting a planned series of specifications to substitute a new specification (as, for example, an emergency shut down sequence), as in item (6) above;

11. a pulse generator including a means for detecting shortages of provided data (pipeline underrun) and interrupting a planned series of specifications to substitute a new specification (as, for example, an emergency shut down sequence), as in item (6) above;

12. implementation of any of items (1) through (11) in an integrated circuit;

13. the inclusion of any of items (1) through (11) in a programmable logic controller;

14. the inclusion of any of items (1) through (11) in an integrated assembly with general purpose processing means and communication means, allowing the functions to be controlled by general purpose computing programs or commands issued by means of a network or other communication medium;

15. the inclusion of any of items (1) through (11) in an integrated circuit with general purpose processing means and communication means, allowing the function of the invention to be controlled by general purpose computing programs or commands issued by means of a network or other communication medium;

16. use of a multi-function high speed counting means integrated with a general purpose processing means, in combination with the pulse generation function of (1)–(11), to monitor absolute and relative position (pulse count), over an indefinitely extended sequence of controlled frequency pulse train operations; and/or 17. use of a selectable clock input frequency with the pulse generator system as described above as a means of extending the useful range of pulse frequencies that may be handled with given data width registers and arithmetic elements.

In certain exemplary embodiments, a pulse train generation function can be included in an integrated circuit with a general purpose processor, general purpose communications circuits, a programmable high speed counter for counting pulses produced by the pulse train generation function, and/or other specialty circuits convenient to the embodiment of a programmable logic controller. The output of the pulse generation function can be coupled to a discrete output of the programmable logic controller, which can be a transistor, opto-coupled transistor, relay, and/or other switching device that delivers the pulses as electrical signals appropriate to various end receivers.

The following description supposes, for clarity, a specific exemplary implementation in specific exemplary registers with exemplary described data formats, accessible to the general purpose processor for manipulation and examination. Actions performed in this exemplary embodiment by the general purpose processor are attributed to "processor" in the description.

The linear ramp Pulse Train Output (lpto) system can allow specification of the pulse train in terms of frequency and change in frequency per unit time. The modes of operation can be as follows:

Major operating modes:

run_steps_n: run for a specified number of pulses, starting from a specified frequency and changing the frequency at a specified rate per unit time. At the completion of the pulse count, load a new step specification.

run_steps_f: run until a specified frequency target is reached, starting from a specified frequency and changing the frequency at a specified rate per unit time. On achieving the specified frequency, load a new step specification.

run_continuous: run at constant frequency for an indefinite time

Transition states:

abort: abort state is entered due to an abort command or certain error events. Abort mode halts any frequency change in progress, and disables pipeline loads or state transitions. Reliable set up for a graceful shut-down is possible, or the unit can simply be commanded to stop.

last_step_n: run for a specified number of pulses, starting from a specified frequency and changing the frequency at a specified rate per unit time. Stop at the completion of the pulse count.

last_step_f: run until a specified frequency target is reached, starting from a specified frequency and changing the frequency at a specified rate per unit time. On achieving the specified frequency stop.

The data registers that specify the operation are:

start frequency (sf): The first frequency value that will be used to generate a pulse width specification.

working frequency (wf): The currently used frequency.

source frequency (src_f): Normally-set to system clock frequency. The output pulse width in system clocks=integer (src_f/wf).

delta frequency (df): This is stored as a composite value, including a magnitude value to add to the working frequency, and a rate value, specifying the interval at which the addition takes place. This register is accessed by firmware by loading the dfh (delta frequency pipeline). The signed addition wf<=wf+df_magnitude, repeated at regular counted clock intervals provides the linear change in frequency with time, when df is held constant. A wide range of interval selections allows a fixed point calculation of wf+df_magnitude to cover a very wide range of desired frequency slopes.

delta change in frequency (ddf): Same format as the magnitude and sign portion of the df register, and accessed by firmware by loading the ddfh (delta delta_frequency pipeline). The signed addition df<=df+ddf, repeated at regular counted clock intervals, provides for linear changes in acceleration with respect to time. In the current implementation, the df and ddf registers are updated on the same schedule. An alternate schedule for the ddf register update is also possible.

compare (cmpr) In run_steps_n, this register counts the pulses. In run_steps_f, this register contains the value of the desired end point frequency. This register is accessed by firmware by loading the cmprh (compare register pipeline).

mode: A coded specification of the normal operating modes: run_steps_n, run_steps_f, run_continuous, last_step_n, last_step_f. This code is actually embedded in the 32 bit field of the df/dfh registers. When df<=dfh, the new code is examined and determines the operating mode of the new step. Firmware may query the mode bits in the df register to verify current operating state.

pulse width (pw): read for diagnostic use only, contains the currently used-value of pulse width in system clocks.

Controls/status flags:

run: run/stop.

abort: Firmware command to enter abort mode, holding frequency constant and blocking pipeline loads. In the case of an add_error, firmware sets this bit to acknowledge awareness of the add_error and that the lpto has entered abort mode automatically.

run_ack: state machine acknowledgement that the lpto is running.

abort_ack: state machine acknowledgement that the lpto has observed the abort bit assertion and is in the abort mode.

active_pulse: indicator that a pulse is committed or in progress primarily useful at the end of sequence where the negation of active_pulse indicates the sequence is complete.

pipe_loaded indicates—that-some pipe register (sf, dfh, cmprh) is loaded. Negation of pipe_loaded signals the firmware that new information is required to continue the linear pto sequence.

add_error: indicates that the lpto has encountered some condition that makes further automatic changes in the frequency problematic. The generic term add error includes all mathematical errors, data format errors, and pipeline status errors that may be detected and reported. On add_error, the lpto enters the abort mode automatically.

transfer pipeline command (xfr_pipe): A write to the xfr_pipe address causes the lpto state machine to load the frequency divider and get ready to make the first pulse of a new sequence. Used to start the machine from idle or pick up a new specification to leave run_continuous state.

Basic Operation

Processor loads src_f, the frequency of the system clock available to measure pulse width as a number of counted clocks. src_f is presumed to remain constant for a complete motion. src_f may be fixed for a system or provided as some selectable clock source.

Processor loads the remaining data pipeline registers, wfh, dfh, ddfh, and cmprh as desired, and writes a xfr_pipeline command to load the working registers wf, df, ddf, cmpr. Typically the pipeline registers are now written with a second set of values to be ready for the next line segment.

The initial working frequency specification, wf, is loaded to the divider. The divider determines a first pulse width specification by dividing src_f/wf. The division result is loaded to a buffered pulse width specification register, pw.

On command to start, the pulse width counter obtains the value of pw, and begins producing pulses by counting clocks. Each output pulse is high for approximately one-half the specified pw count, and low for the remainder of the pw count. At the completion of each pw count, a new value of the buffered pw from the divider is fetched and another pulse width is counted out.

Concurrent with the counting out of pulse widths, an interval timer is marking update events as specified by the time specification portion of the df register. On each update event, wf is loaded with a new value of wf+df, df is loaded with a new value of df+ddf. This regular addition of df and ddf increments at equidistant times performs the calculations:

$$3wf=wf(0)+3df*time$$

$$3df=df(0)+3ddf*time$$

with the accumulation of scaled, fixed point additions being substituted for multiplications.

Each new frequency value wf is loaded to the divider, which produces a new pulse width specification pw=src_f/wf. The latest value of pw is available to the pulse width counter to use for timing the next pulse on each pulse boundary. Note that pulse widths are changing throughout a sequence, while the update interval is fixed. New values of pw may be presented at any time during a pulse, and may be replaced by yet new values before the next pulse start requires a new pw. Synchronous machinery assures that only valid values of pw are transferred to the pulse width counter.

This operation continues until the end of a line segment. Depending on the mode of operation, the end of the line segment is marked by:

completing a specified number of pulses, as counted down in the cmpr register (run_steps_n or last_step_n)

wf reaching a frequency as specified in the cmpr register (run_steps_f or last_step_f), or a xfr_pipeline command from the processor, the normal escape from a run_continuous segment, the processor commanding an abort, an error escape from any mode.

On completion of a run_steps_n or run_steps_f segment, new specifications from the pipeline registers are loaded to the working registers, the new line segment commences, and the processor is notified so that new pipeline register values may be loaded for yet another line segment if desired. Additional line segments, with possible changes in mode carried in their specifications, may be loaded indefinitely.

On completion of a last_step_n or last_step_f, the pulse width counter is commanded to stop issuing pulses on the completion of a pulse, and the processor is notified of process completion. Additional line segments, with possible changes in mode carried in their specifications, may be loaded indefinitely.

A xfr_pipeline command during run_continuous mode causes new line segment specifications to be loaded, which may include a change in mode. Typically this would be a run_steps_f line segment to transition to a new speed or a last_step_f segment to decelerate to a smooth stop. Additional line segments, with possible changes in mode carried in their specifications, may be loaded indefinitely.

An abort command maybe initiated as a response to internal errors (e.g. an illegal result in a math operation), or external events (e.g., an unexpected-shut down-request in the-larger-programmable logic control system). The abort command stops operation of the update interval timer, the divider, and pipeline loads, readying the system to be set up for a new line segment. The pulse width counter continues to issue pulses at the last pw value specified, maintaining the external motor or other target device at a constant speed. The processor may command an immediate stop, or, more typically, load a new line segment specification in the pipe line registers and execute a xfr_pipeline command to initiate the new segment. The new line segment might be a smooth transition to a new operating point or a smooth deceleration to stop.

State changes of the lpto state machine can be described by the following simplified code:

```
process advance_state :
  if current_state = idle then
    if all pipe registers loaded and xfr_pipe = '1' then
      load pipe registers to working registers
        wf <= sf
        df <= dfh, ddf <= ddfh
        cmpr <= cmprh
      start divider
      wait for divider complete
      current_state <= loaded
    end if ; -- valid xfr pipe
  end if ; --
  if current_state = loaded then
    if run_cmd = '1' then current_state <= find_active_state ;
    elsif any pipe loaded and xfr_pipe = '1' then
      current_state <= loading operation in idle
    end if ; -- run or not
  end if ; -- loaded state
------------------------find_active_state : new pipelined state -----
  if current_state = find_active_state then
    case mode_request is
      when run_steps_f_id => current_state <= run_steps_f ;
      when run_steps_n_id => current_state <= run_steps_n ;
      when run_cont_id => current_state <= run_cont ;
      when last_step_f_id => current_state <= last_step_f ;
      when last_step_n_id => current_state <= last_step_n ;
      when others => current_state <= finish ;
    end case ; -- mode selections
  end if ; -- find active state
----------------------------------------- run steps n ----------------
```

-continued

```
if current_state = run_steps_n then
    if run_cmd = '1' and abort_cmd = '0' then
        if add_error = '1' then current_state <= abort ;
        elsif pulse count complete = '1' then current_state <= find_active_state
        end if ; -- end of a step
    elsif run_cmd = '0' then current_state <= estop ;
    elsif abort_cmd = '1' then current_state <= abort ;
    end if ; -- command escapes
end if ; -- run_steps_n state
----------------------------------------- last step n ----------------
if current_state = last_step_n then
    if run_cmd = '1' and abort_cmd = '0' then
        if add error = '1' then current_state <= abort ;
        elsif pulse count complete = '1' then current_state <= finish ;
        end if ; -- end of a step
    elsif run_cmd = '0' then current_state <= estop ;
    elsif abort_cmd = '1' then current_state <= abort ;
    end if ; -- command escapes
end if ; -- last_step_n state
----------------------------------------- run steps f ----------------
if current_state = run_steps_f then
    if run_cmd = '1' and abort_cmd = '0' then
        if frequency goal reached = '1' then current_state <= find_active_state ;
        end if ; -- end of a step
    elsif run_cmd = '0' then current_state <= estop ;
    elsif abort_cmd = '1' then current_state <= abort ;
    end if ; -- command escapes
end if ; -- run_steps_n state
----------------------------------------- last step f ----------------
if current_state = last_step_f then
    if run_cmd = '1' and abort_cmd = '0' then
        if frequency goal reached = '1' then current_state <= finish ;
        end if ; -- end of a step
    elsif run_cmd = '0' then current_state <= estop ;
    elsif abort_cmd = '1' then current_state <= abort ;
    end if ; -- command escapes
end if ; -- last_step_n state
-----------------------------------------run continuous ------------
-- exit from run continuous on pulse rising edge after xfr_pipe
-- initiate divide, then transition to new state when divide complete
if current_state = run_cont then
    if run_cmd = '1' and abort_cmd= '0' then
        if xfr_pipe command then
            load pipe registers to working registers, start divider
            wait for divider complete
            current_state <= find_active_state ;
        end if ; -- xfr pipe
    elsif run_cmd = '0' then current_state <= estop ;
    elsif abort_cmd = '1' then current_state <= abort ;
    end if ; -- run/abort combinations
end if ; -- run continuous state
--------------------------------- abort -------------------------------
if current_state = abort then
    if run_cmd = '0' then current_state <= estop ;
    elsif abort_cmd = '0' and add error = '0' then current_state <= run_cont ;
    end if ; -- abort escapes
end if ; -- abort state
------------ estop and finish -------- redundant states
if current_state = estop then
    if active_pulse = '0' and run_cmd = '0' then current_state <= idle ; end if
;
end if ; -- estop state
if current_state = finish then
    if active_pulse = '0' and run_cmd = '0' then current_state <= idle ; end if
;
end if ; -- finish state
end process advance_state ;
```

Actions performed in each state are described by the following simplified code:

```
if current_state = run_steps_n or current_state = last_step_n then
    if periodic_update = '1' then --- at scheduled intervals
        update wf <= f+df, df = df+ddf checking for overflow and negative result
        if add error detected, signal state machine and firmware
        else, signal divider to find new pulse width = src_f / wf
        end if ; -- add error report or not
    end if ; -- periodic update event
end if ; -- either compare n mode
-----------------------------------------------------------------------
if current_state = run_steps_n then
    if rising pulse edge, count down cmpr, checking for negative result
        if negative cmpr ( due to loading pulse count = 0 ) signal add_error
        elsif pulse count complete then
            if new cmprh value loaded then
                transfer loaded pipe registers
                signal state machine to find new state
            else, signal add_error
            end if ; -- valid pipe entry or not
        end if ; -- zero goal error or not
    end if ; -- count pulse event cases
end if ; -- run_steps_n case
-----------------------------------------------------------------------
if current_state = last_step_n then
    { same as run_steps_n except signal state machine to finish on pulse count complete
}
    end if ; -- run_steps_n case
-----------------------------------------------------------------------
if current_state = run_cont then
    if xfr_pipe command then
        if new cmprh value loaded then
            transfer any loaded pipe registers on next rising pulse edge
        else, signal add_error
        end if ; -- valid pipe entry or not
    end if ; -- pipe xfr event
end if ; -- run continuous case
-----------------------------------------------------------------------
if current_state = run_steps_f or current_state = last_step_f then
    -- update f+df, checking for compare result
    if periodic_update = '1' then
        if df positive, (increasing f), and wf+df not greater than compare
                or df negative, and wf+df still greater than compare    then
            wf <= wf + df, df <= df + ddf
            signal divider to find new pulse width = src_f / wf
        else - new f exceeds specified goal
            wf <= cmpr
            signal divider to find new pulse width = src_f / wf
            if new cmprh value loaded then
                transfer loaded pipe registers
                signal state machine to find new state
            else, signal add_error
            end if; -- valid pipe entry or not
        end if ; -- frequency compare cases
    end if ; -- periodic update
end if ; -- either compare f mode
```

Registers

Note: "Don't care" bits (x) always return 0 when registers containing those bits are read.

PLS0 Registers

| XDATA Address | Description |
|---|---|
| x | register name: PLS0_Control_Register (PLS0CTL)<br>size: byte (8-bit)<br>access: read/write<br>reset value: 00H |

| 7 | | | | | | | 0 |
|---|---|---|---|---|---|---|---|
| x | x | x | A | R | x | x | x |

(3) LPTO_run: 1 = run, 0 = stop LPTO
(4) LPTO_abort: 1 = enter abort mode, or acknowledge add error, 0 = no action
Reading the register will return the value stored in the register.

| x | register name: Linear_PTO_Src_F<br>size: 32 bits (26 active, 31:26 read 0)<br>access: read/write<br>reset value: 00100000H ($2^{20}$)<br>Normally set to system clock frequency. Numerator for linear pto pulse width.<br>pulse width in system clocks = Src_F/PLS0WF or Src_F/PLS1WF.<br>Single register for both LPTO. |
|---|---|
| x | register name: PLS0_Interrupt_Enable_Register (PLS0IEN)<br>size: byte (8-bit)<br>access: read/write<br>reset value: 00H |

| 7 | | | | | | | 0 |
|---|---|---|---|---|---|---|---|
| LAE | PE | AP | AA | x | x | x | x |

4: LPTO_abort_ack_assertion: 1 enables abort ack rising edge rupt
5: LPTO_active_pulse_negation: 1 enables active pulse falling edge rupt
6: LPTO_pipeline_empty_event: 1 enables pipe_loaded flag falling edge rupt
7: LPTO_add_error: 1 enables rupt on add error
Reading the register will return the value stored in the register.

| x | register name: PLS0_Status_Register (PLS0STAT)<br>size: byte (8-bit)<br>access: read-only<br>reset value: 00H |
|---|---|

| 7 | | | | | | | 0 |
|---|---|---|---|---|---|---|---|
| LE | PL | AP | AA | RA | x | x | x |

3 : LPTO_run_ack: 1 when state machine is in a pulse producing state.
4: LPTO_abort_ack: 1 when the state machine is in abort ack mode, pipeline is available for refresh
5: LPTO_active_pulse: 1 when the pulse generator is committed to producing a pulse. Becomes 1 shortly after run_ack =>1, persists for duration of last pulse after run_ack =>0.
6: LPTO_pipe_loaded: 1 when cmprh pipe register least significant byte loaded. This byte load is taken as a key indicator that firmware has completed a valid pipeline register load. 0 = valid pipeline register load not complete.
7: LPTO_add_error: 1 when F + dF error has occurred. Once set, an abort or stop command (run = 0) is required to clear. The error is cleared immediately on run = 0. The state machine automatically enters abort state on add error detection, but withholds abort_ack. Firmware setting of the abort command bit acknowledges the add_error detection to the state machine and elicits an abort_ack response. The error is cleared with abort_ack assertion.
In current implementation, run ack and abort ack are asserted immediately in response to commands. run_ack negated and active_pulse asserted indicates a last pulse in progress.

| x | register name: PLS0_Interrupt_Status_Register (PLS0ISTAT)<br>size: byte (8-bit) |
|---|---|

-continued

PLS0 Registers

| XDATA Address | Description |
|---|---| access: read-only
reset value: 00H

| 7 | | | | | | | 0 |
|---|---|---|---|---|---|---|---|
| LE | PE | AP | AA | x | x | x | x |

4: LPTO_abort_ack_assertion_event
    5: LPTO_active_pulse_negation event
    6: LPTO_pipeline_empty_event (falling edge of pipe_loaded)
    7: LPTO_add_error_event
    Reading this register will clear the interrupt-generating event detection. Continued
    status information is maintained in the STAT register.

x   register name:     PLS0_Starting_Frequency (PLS0SF)
    size:     double-word (32-bit)
    access:     write only
    reset value:     00000000H
    bit 31 : not written, forced to 0
    bit 30:11 : integer pulse frequency, 1 to $2^{20} - 1$ valid range
    bit 10: 0 : 11 bit fractional frequency
    sf_pipe_loaded flag is set on lsb write
    on xfr_pipeline event, wf <= sf iff sf_lsb loaded x   register name:     PLS0_Delta_Frequency_Pipeline_Register (PLS0DFH)
    size:     double-word (32-bit)
    access:     write only
    reset value:     00000000H
    df_pipe_loaded flag is set on lsb write
    on xfr_pipeline event, df <= dfh iff dfh_lsb loaded
    see PLS0DF register for description of bit fields   register name:     PLS0_Delta_Delta_Frequency_Pipeline_Register (PLS0DDFH)
    size:     double-word (32-bit)
    access:     write only
    reset value:     00000000H
    ddf_pipe_loaded flag is set on lsb write
    on xfr_pipeline event, ddf <= ddfh iff ddfh_lsb loaded
    see PLS0DDF register for description of bit fields x   register name:     PLS0_Compare_Pipeline_Register (PLS0CMPRH)
    size:     double-word (32-bit)
    access:     write only
    reset value:     00000000H
    cmpr_pipe_loaded flag is set on lsb write
    on xfr_pipeline event, cmpr <= cmprh iff cmprh_lsb loaded
    see PLS0CMPR register for description of use
    if run_steps_n state, a value of zero or a negative value will result in one pulse.
    if transitioning to a run_steps_n state with the CMPRH not loaded, pulses will stop
    at the completion of the last pulse in the prior sequence.

x   register name:     PLS0_Working_Frequency_Register (PLS0WF)
    size:.     double-word (32-bit)
    access: read only, not latched for stable read during ramps, can be read
    reliably in abort, run continuous, or when DF value field = 0.
    reset value: 00000000H
    on xfr_pipeline event, WF <= SF iff cmprh_lsb loaded
    when running, WF <= WF + DF at selected intervals
    can be read reliably in abort or run continuous mode x   register name:     PLS0_Delta_Frequency_(PLS0DF)
    size:     double-word (32-bit)
    access:     read only, not reliably read near pipe loads
    reset value:     00000000H
    bit 31: sign bit for delta F
    bit 30:28 : run mode for step
    000, 100, 111 = stop / idle step
    001 = run step, compare on pulse count ( run_steps_n)
    010 = run step, compare on frequency ( run_steps_f)
    011 = run continuous     (run_cont)
    101 = last step, compare on pulse count ( last_step_n)
    110 = last step, compare on frequency ( last_step_f)
    Note the mode, and sign of dF can be captured as a single read. Examination with
    the contents of the STAT register gives a description of the current operating state
    of the pulse generator.

-continued

PLS0 Registers

| XDATA Address | Description |
|---|---|
| | bit 27: 24 : 4 bit code for interval between DF additions
0001 => $2^8$
0010 => $2^{10}$
0011 => $2^{12}$ . . .
1001 => $2^{24}$
1111 => $2^1$ (test use only)
others => $2^7$ (fastest rate that divider can support)
bit 23 : 0 : DF value, 13 bit interger + 11 bit fraction |
| x | register name: PLS0_Delta_Delta_Frequency_(PLS0DDF)
size: double-word (32-bit)
access: read only, not reliably read near pipe loads
reset value: 00000000H
bit 31 : sign bit for delta delta F
bit 30:24 unused
bit 23 : 0 : DDF value, 13 bit interger + 11 bit fraction |
| x | register name: PLS0_Compare_Register (PLS0CMPR)
size: double-word (32-bit)
access: read only, not reliably read in counted pulse steps or near pipe loads
reset value: 00000000H
pulse count target value, or compare frequency target value in same format as PLS0SF
pulse count: count down from loaded value to 1, then transfer pipeline
frequency compare: if DF is positive, iterate WF + DF until > compare value
    if DF negative, iterate WF + DF until < compare value
    when range exceeded WF <= CMPR, transfer pipeline |
| X | register name: PLS0_Pulse_Width_Register (PLS0PW)
size: double-word (26 bits active, others = 0)
access: read only, not reliably read during ramps or near pipe loads
reset value: 00000000H
diagnostic use only: output of divider, integer clocks / pulse. |
| 013AH | register name: PLS0_transfer_pipeline ( PLS0XFRP)
size: —
access: write only
reset value: —
transfer pipeline address : write to this address moves loaded pipelines to work registers.
Normal start up:
write PLS0SF, PLS0DFH, PLS0CMPRH
write any value to PLS0XFRP
write as desired PLS0SF |

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of the appended claims. For example, regardless of the content of any portion (e.g., title, field, background, summary, abstract, drawing figure, etc.) of this application, unless clearly specified to the contrary, there is no requirement for the inclusion in any claim of the application of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render a claim invalid, then any such conflicting information in such incorporated by reference material is specifically not incorporated by reference herein.

What is claimed is:

1. A method for producing pulsed outputs from a programmable logic controller, comprising:
   in a programmable logic controller, automatically changing a first user-specified pulse frequency to a second pulse frequency; and
   automatically outputting a plurality of pulses from the programmable logic controller at frequencies varying between the first user-specified pulse frequency and the second pulse frequency according to a user-specified linear-time-rate variation.

2. The method of claim 1, wherein the user-specified linear-time-rate variation is a change in a pulse frequency with respect to time.

3. The method of claim 1, wherein the user-specified linear-time-rate variation is a change in a controlled system velocity with respect to time.

4. The method of claim 1, wherein the user-specified linear-time-rate variation is a change in a pulse acceleration with respect to time.

5. The method of claim 1, wherein the user-specified linear-time-rate variation is a change in a controlled system acceleration with respect to time.

6. The method of claim 1, further comprising:
receiving a signal indicative of the user-specified linear-time-rate variation.

7. The method of claim 1, further comprising:
computing a plurality of pulse frequencies corresponding to the user-specified linear-time-rate variation between the first user-specified pulse frequency and the second pulse frequency.

8. The method of claim 1, further comprising:
computing a plurality of pulse accelerations corresponding to the user-specified linear-time-rate variation between the first user-specified pulse frequency and the second pulse frequency.

9. The method of claim 1, further comprising:
computing a target pulse frequency corresponding to the second pulse frequency, the second pulse frequency user-specified.

10. The method of claim 1, further comprising:
computing a target pulse frequency corresponding to the second pulse frequency, the second pulse frequency non-user-specified.

11. The method of claim 1, further comprising:
computing a target pulse acceleration corresponding to the user-specified linear-time-rate variation.

12. The method of claim 1, wherein the user-specified linear-time-rate variation is received from a graphical pulse frequency output profile.

13. The method of claim 1, wherein the user-specified linear-time-rate variation is derived from a graphical pulse frequency output profile.

14. The method of claim 1, wherein the user-specified linear-time-rate variation is received from a pulse frequency output profile comprising a plurality of line segments, each of the line segments representing a frequency output selected from an increasing frequency output, a decreasing frequency output, and a constant frequency output.

15. The method of claim 1, wherein the user-specified linear-time-rate variation is received from a pulse frequency output profile comprising a plurality of line segments, each of the line segments comprising a plurality of user-specifiable variation characteristics.

16. The method of claim 1, wherein the user-specified linear-time-rate variation is received from a pulse frequency output profile comprising a plurality of line segments, each of the line segments comprising user-specifiable characteristics selected from a magnitude of change, a rate of change, a polarity of change, a duration, and a length.

17. The method of claim 1, wherein the user-specified linear-time-rate variation is received from a pulse frequency output profile comprising a plurality of line segments, at least one of the line segments having a length specified as a number of pulses.

18. The method of claim 1, wherein the user-specified linear-time-rate variation is received from a pulse frequency output profile comprising a plurality of line segments, at least one of the line segments having an indefinite length terminable by a predetermined external event or reaching a predetermined frequency goal.

19. The method of claim 1, further comprising:
abruptly terminating the plurality of pulses.

20. The method of claim 1, further comprising:
automatically changing the user-specified linear-time-rate variation from one line segment to a successor line segment of a pulse frequency output profile comprising a plurality of line segments each having a length specified as a number of pulses, an indefinite length that is terminated by an external event, or a length that is terminated by reaching a specified frequency goal.

21. The method of claim 1, wherein the second pulse frequency is a result of accumulating changes in frequency until a specified pulse count is reached.

22. The method of claim 1, wherein the second pulse frequency is a result of accumulating changes in frequency until an occurrence of an external event.

23. The method of claim 1, wherein the second pulse frequency is an explicitly specified frequency goal.

24. A machine-readable medium containing machine-executable instructions for activities comprising:
in a programmable logic controller, automatically changing a first user-specified pulse frequency to a second pulse frequency; and
automatically outputting a plurality of pulses from the programmable logic controller at frequencies varying between the first user-specified pulse frequency and the second pulse frequency according to a user-specified linear-time-rate variation.

25. A system for producing pulsed outputs comprising:
a pulse generator adapted to produce linear changes in frequency with respect to time by adding or subtracting a specified frequency increment to a specified frequency at regular specified intervals to create a frequency specification,
a divider mechanism adapted to convert the frequency specification to a pulse width specification,
a pulse width generator adapted to produce a desired pulse output by counting clocks of a fixed reference frequency according to the pulse width specification.

26. The system of claim 25, wherein said pulse generator is adapted to produce the linear changes in frequency with respect to time by adding or subtracting a specified acceleration increment to the specified frequency increment.

27. The system of claim 25, further comprising a plurality of pipeline data registers and a controlling state machine, said pipeline data registers and said controlling state machine adapted to provide a planned automatic change from a specification of a first pulse output to a second pulse output specification upon completion of a specified pulse count for the first pulse output.

28. The system of claim 25, further comprising a plurality of pipeline data registers and a controlling state machine, said pipeline data registers and said state machine adapted to provide a planned automatic change from a specification of a first pulse output to a second pulse output specification upon reaching a specified frequency goal for the first pulse output.

29. The system of claim 25, further comprising a plurality of pipeline data registers and a controlling state machine, said pipeline data registers and said state machine adapted to provide a planned automatic change from a first pulse output specification to a second pulse output specification, a duration of the first pulse output specification being indefinitely extended until an occurrence of an external event.

30. The system of claim 25, further comprising a plurality of pipeline data registers and a controlling state machine, said pipeline data registers and said state machine adapted to abort execution of a pulse output specification in progress.

31. The system of claim 25, further comprising a plurality of pipeline data registers and a controlling state machine, said pipeline data registers and said state machine adapted to black a planned automatic change from a first pulse output specification to a second pulse output specification.

32. The system of claim 25, further comprising a plurality of pipeline data registers and a controlling state machine comprising an abort state in which an action of a first currently executing line segment is interrupted by suspending further changes in frequency and acceleration and suspending a planned automatic change from a specification of the first currently executing line segment to a specification of a second planned line segment, allowing for the-maintenance of a steady state pulse train while a new specification is substituted for the second planned line segment, wherein the abort state is entered by external command, by detection of an incipient math error, or by detection of incomplete specification data associated with the second planned line segment.

33. The system of claim 25, further comprising an update interval counter and an encoded specified interval.

34. The system of claim 25, further comprising an update interval counter and an encoded specified interval, a duration of the regular specified intervals controlling a repetition of incremental additions to frequency and acceleration.

35. The system of claim 25, further comprising a halter adapted to stop the pulse output precisely upon completion of a final specification.

36. The system of claim 25, further comprising a counter adapted to monitor absolute and relative position over an indefinitely extended sequence of controlled frequency pulse train operations.

37. The system of claim 25, further comprising a counter adapted to monitor pulse count over an indefinitely extended sequence of controlled frequency pulse train operations.

38. The system of claim 25, further comprising a selectable clock input frequency.

39. The system of claim 25, wherein said system is implemented in an integrated circuit.

40. The system of claim 25, wherein said system is implemented in a programmable logic controller.

41. The system of claim 25, wherein said system is implemented in an information device comprising a network interface.

42. The system of claim 25, wherein said system is implemented in an information device comprising an Internet interface.

* * * * *